US011268443B2

(12) United States Patent
Peyron et al.

(10) Patent No.: US 11,268,443 B2
(45) Date of Patent: Mar. 8, 2022

(54) TURBINE ENGINE NACELLE COMPRISING A COOLING DEVICE

(71) Applicant: Safran Nacelles, Gonfreville l'Orcher (FR)

(72) Inventors: Vincent Peyron, Gonfreville l'Orcher (FR); Patrick Gonidec, Gonfreville l'Orcher (FR); Jean-Nicolas Bouchout, Gonfreville l'Orcher (FR)

(73) Assignee: Safran Nacelles, Gonfreville l'orcher (FR)

(*) Notice: Subject to any disclaimer, the term of this patent is extended or adjusted under 35 U.S.C. 154(b) by 0 days.

(21) Appl. No.: 16/253,352

(22) Filed: Jan. 22, 2019

(65) Prior Publication Data

US 2019/0153947 A1    May 23, 2019

Related U.S. Application Data

(63) Continuation of application No. PCT/FR2017/051967, filed on Jul. 19, 2017.

(30) Foreign Application Priority Data

Jul. 20, 2016  (FR) .................................. 16/56910

(51) Int. Cl.
*F02C 7/14* (2006.01)
*F02C 7/16* (2006.01)
*F02K 3/115* (2006.01)
*B64D 33/10* (2006.01)
(Continued)

(52) U.S. Cl.
CPC ................ *F02C 7/14* (2013.01); *B64D 29/06* (2013.01); *B64D 33/08* (2013.01); *B64D 33/10* (2013.01);
(Continued)

(58) Field of Classification Search
CPC ...... F02C 7/12; F02C 7/14; F02C 7/16; F02C 7/04; F05D 2260/204; F05D 2260/96; B64D 29/06
See application file for complete search history.

(56) References Cited

U.S. PATENT DOCUMENTS 2,599,879 A    6/1952  Walker
7,377,100 B2   5/2008  Bruno et al.
(Continued)

FOREIGN PATENT DOCUMENTS

EP   1895124   3/2008
FR   2987602   9/2013
GB   2224080   4/1990

OTHER PUBLICATIONS

International Search Report for International Application PCT/FR2017/051967, dated Nov. 7, 2017.

*Primary Examiner* — Todd E Manahan
*Assistant Examiner* — Thuyhang N Nguyen
(74) *Attorney, Agent, or Firm* — Burris Law, PLLC

(57) ABSTRACT

A nacelle of a turbine engine has a substantially tubular structure and defines a secondary channel. The nacelle includes a shroud forming a trailing edge on a downstream end of the nacelle, the shroud being defined by at least one outer face subjected to an outside air flow and an inner face subjected to an inside air flow circulating in the secondary channel of the nacelle. The nacelle further includes a cooling device having at least one heat-exchange channel that extends into the shroud.

8 Claims, 3 Drawing Sheets

(51) Int. Cl.
  *F02C 7/00* (2006.01)
  *B64D 29/06* (2006.01)
  *B64D 33/08* (2006.01)
  *F02K 3/06* (2006.01)

(52) U.S. Cl.
  CPC .................. *F02C 7/00* (2013.01); *F02C 7/16* (2013.01); *F02K 3/115* (2013.01); *F02K 3/06* (2013.01); *F05D 2220/323* (2013.01); *F05D 2260/213* (2013.01); *F05D 2260/98* (2013.01); *Y02T 50/60* (2013.01)

(56) References Cited

U.S. PATENT DOCUMENTS

| | | | |
|---|---|---|---|
| 8,266,888 B2 * | 9/2012 | Liu | F02C 6/08 60/266 |
| 8,387,362 B2 * | 3/2013 | Storage | F28F 1/022 60/266 |
| 9,677,474 B2 * | 6/2017 | Hundley, Jr | F02C 7/32 |
| 9,777,963 B2 * | 10/2017 | Martinez | F28F 9/0224 |
| 9,835,380 B2 * | 12/2017 | Kupiszewski | F28D 1/05375 |
| 10,738,923 B2 * | 8/2020 | Tajiri | F01D 25/243 |
| 2005/0268612 A1 * | 12/2005 | Rolt | F02C 7/185 60/728 |
| 2006/0042225 A1 | 3/2006 | Bruno et al. | |
| 2008/0251315 A1 * | 10/2008 | Ayle | F02C 7/24 181/292 |
| 2009/0165995 A1 * | 7/2009 | Bajusz | F01D 25/02 165/51 |
| 2014/0209286 A1 * | 7/2014 | Freund | F01P 3/12 165/168 |

* cited by examiner

TURBINE ENGINE NACELLE COMPRISING A COOLING DEVICE

CROSS-REFERENCE TO RELATED APPLICATIONS

This application is a continuation of International Application No. PCT/FR2017/051967, filed on Jul. 19, 2017, which claims priority to and the benefit of FR 16/56910 filed on Jul. 20, 2016. The disclosures of the above applications are incorporated herein by reference.

FIELD

The present disclosure relates to a turbine engine nacelle including a cooling device for a turbine engine.

BACKGROUND

The statements in this section merely provide background information related to the present disclosure and may not constitute prior art.

An aircraft is propelled by one or more propulsion unit(s) each comprising a turbine engine housed in a tubular nacelle.

Each propulsion unit is fastened to the aircraft by a mast located generally under or above a wing, or at the fuselage.

A nacelle generally has a structure comprising an air inlet upstream of the engine, a median section intended to surround a fan or the compressors of the turbine engine and its casing, a downstream section capable of accommodating thrust reverser means and intended to surround the combustion chamber of the turbine engine, and is generally terminated by an ejection nozzle whose outlet is located downstream of the turbine engine.

Generally, the turbine engine comprises a set of blades driven in rotation by a gas generator through a set of transmission means.

A lubricant distribution system is provided to ensure proper lubrication of these transmission means and to cool them.

Consequently, the lubricant must then also be cooled by means of a heat exchanger.

To this end, a first known method consists in cooling the lubricant by circulation through an air/oil exchanger using air taken from the secondary flow path, having a flow called cold flow, of the nacelle.

The sampling and the circulation of air through this exchanger disturbs the flowing of the air flow and leads to undesirable additional pressure losses.

A cooling device is also known, including an exchanger arranged on a wall delimiting the secondary flow path, the fluid is cooled by the flowing of air from the secondary flow path which circulates along the surface of the exchanger.

U.S. Pat. No. 7,377,100 describes and represents such a type of cooling device.

This type of device uses a large surface exchanger which is difficult to arrange in the secondary flow path, especially if it is desired to preserve the surfaces of the nacelle treated acoustically.

There is also known a type of cooling device which includes an exchanger in contact with the outer wall of the nacelle, like the devices described in documents EP 1895124 and FR 2987602.

More particularly, document FR 2987602 describes a cooling device which is equipped with a heat exchanger associated with at least one circulation duct forming at least one recirculation loop through the exchanger and comprising at least one circulation area extending at least partially along the outer fairing in contact with at least one wall of said outer fairing, so as to allow a heat exchange by conduction with the external air of the nacelle.

Although this type of device is effective in the flight phase of the aircraft, the use of the outer surfaces of the nacelle provides little or no cooling capacity when the aircraft is on the ground.

SUMMARY

The present disclosure relates to a turbine engine nacelle having a substantially tubular structure and delimiting a secondary flow path, the nacelle comprising a shroud which forms a trailing edge at a downstream end of the nacelle and which has a generally tubular shape about a longitudinal axis, the shroud being delimited by at least one outer face subjected to an outside air flow and an inner face subjected to an inside air flow circulating in the secondary flow path of the nacelle, the nacelle including a cooling device which comprises at least one heat exchange channel which has an inlet and an outlet which are connected to a source of heat transfer fluid by an inlet duct and an outlet duct respectively, the nacelle being characterized in a way that the exchange channel extends into the shroud.

According to the present disclosure:

said at least one channel may be delimited by an outer wall, an inner wall and two lateral walls, the outer wall can be formed by the outer face of the shroud, the inner wall can be formed by the inner face of the shroud, or said at least one channel may comprise a wall formed by the inner face of the shroud and another wall connected to the outer face of the shroud by a rib, or said at least one channel may comprise a wall formed by the outer face of the shroud and another wall connected to the inner face of the shroud by a rib, or said at least one channel may comprise a wall connected to the inner face of the shroud by a first rib and connected to the outer face of the shroud by a second rib.

The characteristics of the nacelle according to the present disclosure make it possible to effectively cool a fluid without damaging the aerodynamic characteristics of the nacelle.

In addition, the shroud forming the trailing edge is a thermally interesting area because the shroud is subjected to the air flow from the secondary flow path that circulates as soon as the engine is turned on, even on the ground. Also, the shroud is subjected to the outer air flow of the nacelle as soon as the aircraft moves forward and during the entire flight phase, which makes it possible to compensate for the decrease in efficiency of the heat exchange surfaces when the aircraft is moving at a higher altitude.

It is estimated that the use of the shroud as a heat exchanger makes it possible to reduce the surface of the exchanger by 20% compared to a heat exchanger installed solely in the secondary flow path.

In addition, the shroud is an area which is generally not treated acoustically which makes it possible to make available again, for acoustic treatment, the areas where the surface exchangers are usually installed, in particular upstream of the thrust reverser.

According to an exemplary form, the exchange channel extends circumferentially about the axis of the shroud.

This characteristic makes it possible to produce the shroud by an extrusion-type method.

According to another exemplary form, the exchange channel is delimited by a plurality of walls, at least one of said walls being formed by one of the faces of the shroud.

According to this characteristic, the faces of the channel are in direct contact with the outside air flow or the air flow of the secondary flow path.

According to another exemplary form, one of the walls of the channel is formed by the inner face of the shroud, and in that another wall of the channel is connected to the opposite outer face of the shroud by a rib.

This characteristic makes it possible to protect the channels from any possible perforations.

According to another form, one of the walls of the channel is formed by the outer face of the shroud, and in that another wall of the channel is connected to the opposite inner face of the shroud by a rib.

According to one variation of the present disclosure, the inner face of the shroud is pierced with a plurality of holes that open into at least one cavity of the shroud thus forming an acoustic resonator.

This variant provides acoustic absorption characteristics to the shroud.

According to another exemplary form, the width of the channel is comprised between one and one hundred millimeters.

According to an exemplary form, the cooling device includes:
 a plurality of exchange channels,
 an inlet collector which is interposed between the inlet duct and the inlet of each exchange channel to supply each channel with the heat transfer fluid to be cooled, and
 an outlet collector which is interposed between the outlet duct and the outlet of each exchange channel to collect the cooled heat transfer fluid.

According to another exemplary form, the inlet duct and the outlet duct are extensible and are adapted to allow a relative spacing between the shroud and the heat transfer fluid source.

According to another exemplary form, the cooling device includes a plurality of first exchange channels and a plurality of second exchange channels which are alternately arranged in contact with the outer face and in contact with the inner face of the shroud, at least one of said walls of the first channels belonging to the outer face of the shroud and at least one of said walls of the second channels belonging to the inner face of the shroud.

According to another exemplary form, the shroud can be obtained by an extrusion-type manufacturing method.

In one form, said at least one channel can be added onto the shroud.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
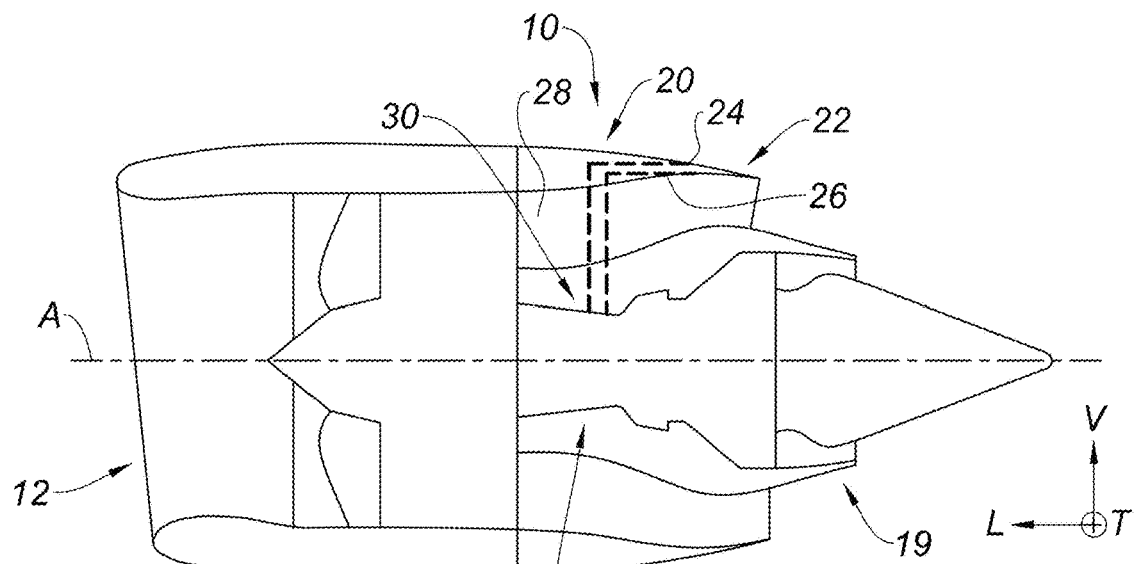
FIG. 1 is a longitudinal sectional view illustrating a nacelle for turbine engine which includes a cooling device according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To clarify the description and the claims, the longitudinal, vertical and transversal terminology will be adopted in a non-limiting manner with reference to the L, V, T trihedron indicated in the figures, where the L axis is parallel to the axis A of the nacelle.

On all figures, identical or similar references designate identical or similar members or sets of members.

It should be noted that in the present disclosure, the terms "upstream" and "downstream" should be understood in relation to the circulation of air flow inside the propulsion unit formed by the nacelle and the turbine engine, that is to say from left to right according to FIG. 1.

FIG. 1 shows a nacelle 10 which extends longitudinally along an axis A and which has a generally tubular structure.

The nacelle 10 comprises an air inlet 12 arranged upstream of a turbine engine 14, a median section 16 intended to surround a fan or the compressors of the turbine engine 14 and its casing, a downstream section 18 able to house the thrust reverser means and intended to surround the combustion chamber of the turbine engine 14, and an ejection nozzle 19 whose outlet is located downstream of the turbine engine 14.

The nacelle 10 includes a cooling device 20, the device 20 comprising a shroud 22 which forms a trailing edge and which is arranged at a downstream end of the nacelle 10.

Figure 4:
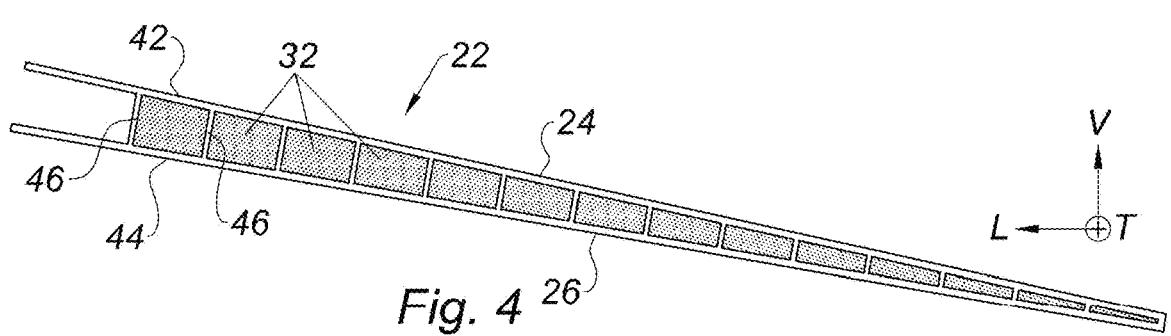
FIG. 4 is a detail view of FIG. 1 illustrating the shroud of the nacelle which includes the heat exchange channels according to a first form of the present disclosure.

The shroud 22 has a generally cylindrical shape around the longitudinal axis A, and more specifically a frustoconical shape of decreasing section according to an upstream to downstream direction, as can be seen in FIG. 4.

More particularly, the shroud 22 is delimited by an outer face 24 which is subjected to an outside air flow and by an inner face 26 which is subjected to an inside air flow circulating in the secondary flow path 28 of the nacelle 10.

The cooling device 20 includes a plurality of heat exchange channels 32, visible in FIG. 4, which extend into the shroud 22 and which are traversed by a heat transfer fluid to dissipate the calories conveyed by the heat transfer fluid.

Figure 2:
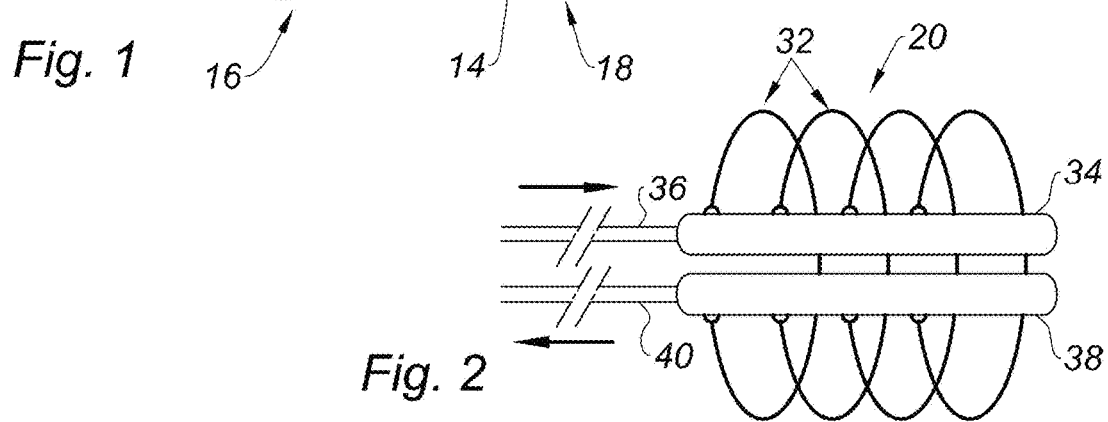
FIG. 2 is a schematic view illustrating a cooling device according to the present disclosure.

To this end, as can be seen in FIG. 2, the exchange channels 32 each have an inlet, the inlets of the channels 32 are interconnected by an inlet collector 34, the inlet collector 34 being connected to a heat transfer fluid source 30 via an inlet duct 36.

Similarly, the exchange channels 32 each have an outlet, the outlets of the channels 32 are interconnected by an outlet collector 38, the outlet collector 38 being connected to the heat transfer fluid source 30 via an outlet duct 40.

The exchange channels 32 can be made, for example by machining, directly in the shroud 22, for example in the inner face 26 and/or the outer face 24. Alternatively, as illustrated in the example of FIG. 2, the exchange channels 32 may comprise one or more element(s) made independently of the shroud 22 and which can then be fixed on the shroud 22. In other words, the exchange channels 32 can be added onto the shroud 22.

The heat transfer fluid is for example a lubricant that stores the calories released by the turbine engine 14 and/or its accessories.

The term "source of heat transfer fluid" means a drawing point of the heat transfer fluid.

The inlet duct 36 and the outlet duct 40 are extensible and are adapted to allow relative spacing between the shroud 22 and the source 30 of heat transfer fluid.

To this end, the inlet duct 36 and the outlet duct 40 can be made of flexible pipe with a bent overlength that allows the deployment of the duct.

Also, the inlet duct 36 and the outlet duct 40 can be made by a telescopic duct.

Figure 3:
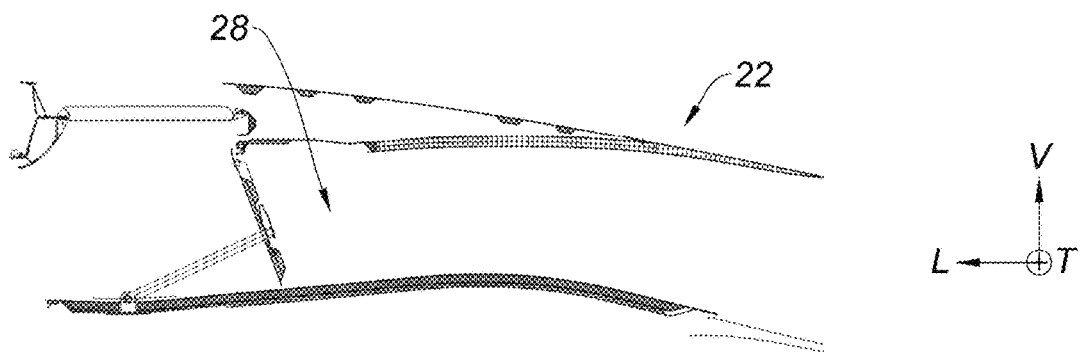
FIG. 3 is a detail view of FIG. 1 illustrating a downstream shroud which includes heat exchange channels of the cooling device.

This characteristic is desired in particular when the cooling device 20 equips a nacelle 10 which includes a thrust reverser with a sliding cowl, such as the sliding cowl shown in FIG. 3.

Indeed, the sliding cowl carries the shroud 22 which is therefore movable in translation compared to the heat transfer fluid source 30 which is arranged on a fixed part of the nacelle 10.

The heat transfer fluid is circulated from the source 30 to the channels 32, by a pumping device (not shown).

Also, each exchange channel 32 extends circumferentially about the axis A of the shroud 22.

The width of each channel 32 is comprised between one and one hundred millimeters. The term "width" shall be understood as the width according to the longitudinal section of the channel concerned.

For the sake of efficiency, shroud 22 and channels 32 are made of a material that is adapted to effectively dissipate calories.

According to one form, the shroud 22 and the channels 32 are made of aluminum.

However, without limitation, the shroud 22 and the channels 32 may also be made of composite material or titanium.

According to a first form of the present disclosure, illustrated in FIG. 4, the cooling device 20 includes fourteen channels 32 which are joined together in a longitudinal direction and which extend about the axis A of the shroud 22.

According to this first form, each channel 32 has a generally parallelepipedic section and each channel 32 is delimited by an outer wall 42, an inner wall 44 and two side walls 46 which form partition walls for separating the adjacent channels 32.

The outer wall 42 of each channel 32 being formed by the outer face 24 of the shroud 22, so that the outer wall 42 of each channel 32 is subjected directly to an air flow outside the nacelle 10.

Conversely, the inner wall 44 of each channel 32 is formed by the inner face 26 of the shroud 22, so that the inner wall 44 of each channel 32 is subjected to an air flow from the secondary flow path 28 of the nacelle 10.

According to this first form, it is observed that the heat transfer fluid circulating through the channels 32 is cooled simultaneously by the air flow of the secondary flow path 28 and by the outside air of the nacelle 10.

Thus, the cooling device 20 according to the present disclosure is effective during the flight phases of the aircraft and during the ground phases of the aircraft.

Figure 5:
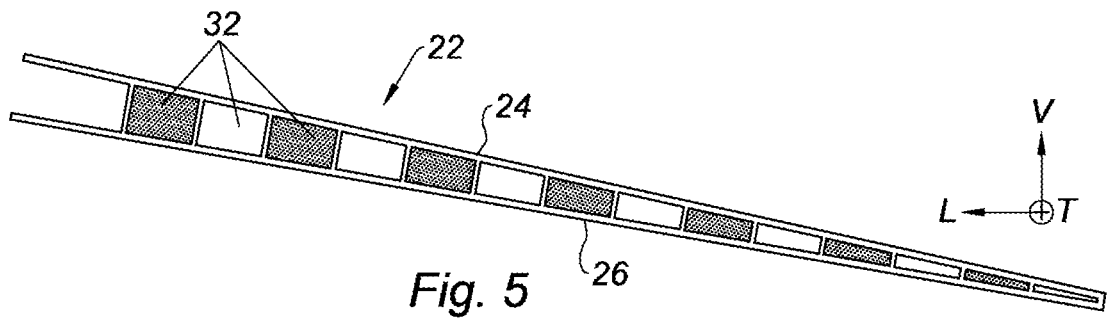
FIG. 5 is a detail view of FIG. 1 illustrating the shroud of the nacelle which includes the heat exchange channels according to a second form of the present disclosure.

FIG. 5 shows a second form of the present disclosure, which is similar to the first form, with the difference that the heat transfer fluid circulates in one channel 32 out of two, each full channel being followed by an empty channel 32, along a longitudinal direction.

The temperatures of the walls of the channels 32 which are not in contact with the heat transfer fluid remain relatively high due to the conduction phenomenon, the empty channel surfaces therefore continue to participate effectively in the heat exchange with the air flows of the secondary flow path and the outside air flows.

This characteristic makes it possible to limit the volume of heat transfer fluid and thus the mass of the shroud 22.

Thus, in the various forms illustrated in FIGS. 4 and 5, at least one channel is delimited by an outer wall 42, an inner wall 44 and two side walls 46, the outer wall 42 being formed by the outer face 24 of the shroud 22, the inner wall 44 being formed by the inner face 26 of the shroud 22.

Figure 6:
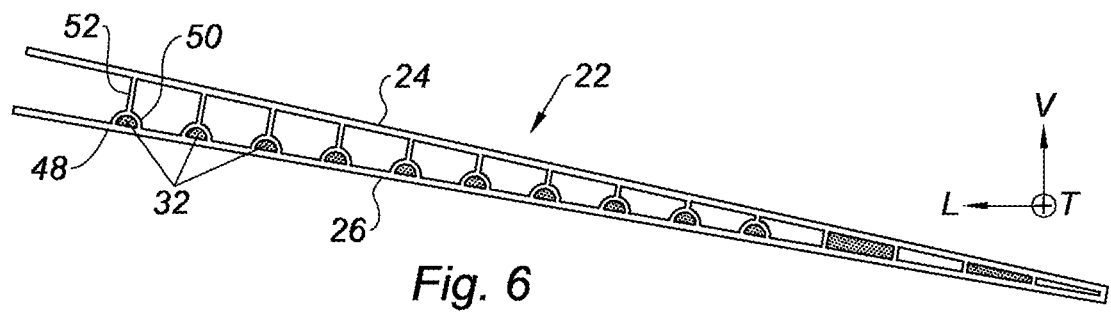
FIG. 6 is a detail view of FIG. 1 illustrating the shroud of the nacelle which includes the heat exchange channels according to a third form of the present disclosure.

According to a third form of the present disclosure illustrated in FIG. 6, each channel 32 includes only one wall that belongs to one of the faces of the shroud 22.

More particularly, each channel 32 has a generally semicircular section which is delimited by a generally planar wall 48 and a semicircular wall 50.

According to this third form, the planar wall 48 of each channel 32 is formed by the inner face 26 of the shroud 22, so that the planar wall 48 of each channel 32 is subjected to the air flow of the secondary flow path 28 of the nacelle 10.

In addition, each channel 32 is associated with a rib 52 that extends along the associated channel and that connects the exchange channel to an opposite face of the shroud 22, here on the outer face 24 of the shroud 22.

The ribs 52 make it possible to transfer the calories by conduction from the heat transfer fluid to the outer face 24 of the shroud 22 so that the outer face 24 also effectively participates in the heat exchange.

This design makes it possible to limit the volume of fluid embedded in the shroud 22 and thus the mass of the shroud 22.

The cooling device according to this third form also makes it possible to inhibit perforation of the outer face 24 from damaging the channels 32 and causing leakage of fluid.

In addition, as the air circulating through the secondary flow path 28 is hotter than the air outside the nacelle 10, this design allows the inner face 26 of the shroud 22 to have a temperature higher than that of the outer face 24, which allows to homogenize the temperature delta between the air flow and the associated face of the shroud 22.

Thus, in one form as illustrated in FIG. 6, at least one channel 32 comprises a wall 48 formed by the inner face 26 of the shroud 22 and another wall 50 connected to the outer face 24 of the shroud 22 by a rib 52.

Figure 7:
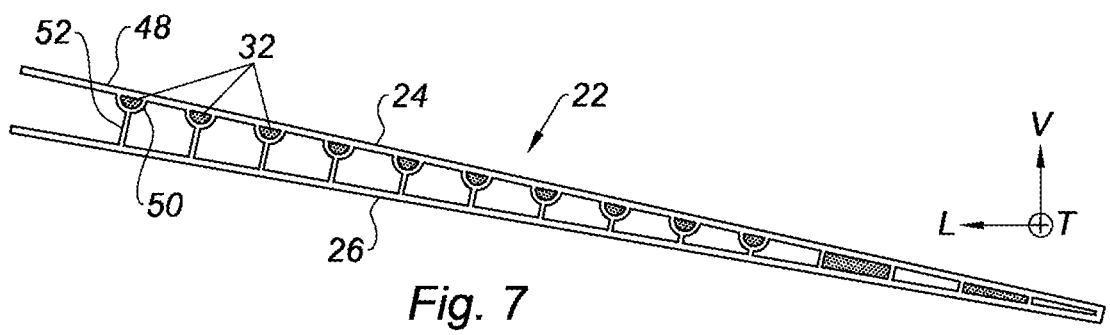
FIG. 7 is a detail view of FIG. 1 illustrating the shroud of the nacelle which includes the heat exchange channels according to a fourth form of the present disclosure.

FIG. 7 shows a fourth form of the present disclosure, which is similar to the third form, with the difference that the planar wall 48 of each channel 32 is formed by the outer face 24 of the shroud 22, so that the planar wall 48 of each channel 32 is subjected to an air flow outside the nacelle 10.

Thus, in one form as illustrated in FIG. 7, at least one channel 32 comprises a wall 48 formed by the outer face 24 of the shroud 22 and another wall 50 connected to the inner face 26 of the shroud 22 by a rib 52.

Figure 8:
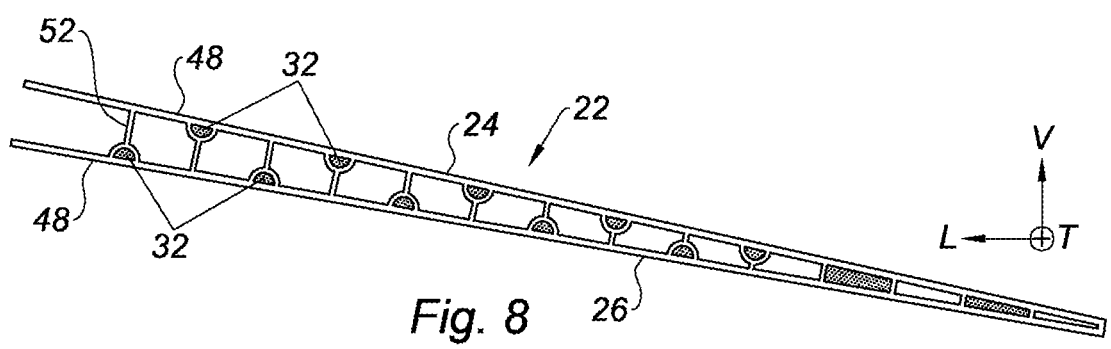
FIG. 8 is a detail view of FIG. 1 illustrating the shroud of the nacelle which includes the heat exchange channels according to a fifth form of the present disclosure.

A fifth form of the present disclosure, illustrated in FIG. 8, includes a series of channels 32 of semicircular section and takes over the characteristics of the two forms described above.

According to this fifth form, the planar wall 48 of a first series of channels 32 is formed by the inner face 26 of the shroud 22, and the planar wall 48 of a second series of channels 32 is formed by the outer face 26 of the shroud 22.

The channels 32 of the first series are arranged in regular alternation with the channels 32 of the second series, as shown in FIG. 8.

Also, the rib 52 of each channel 32 is connected to the face of the shroud 22 opposite the flat face 48 of the concerned channel 32.

This design makes it possible to enhance the temperatures of the outer face 24 and of the inner face 26 of the shroud 22 in order to increase the thermal power exchanged via the channels 32.

Figure 9:
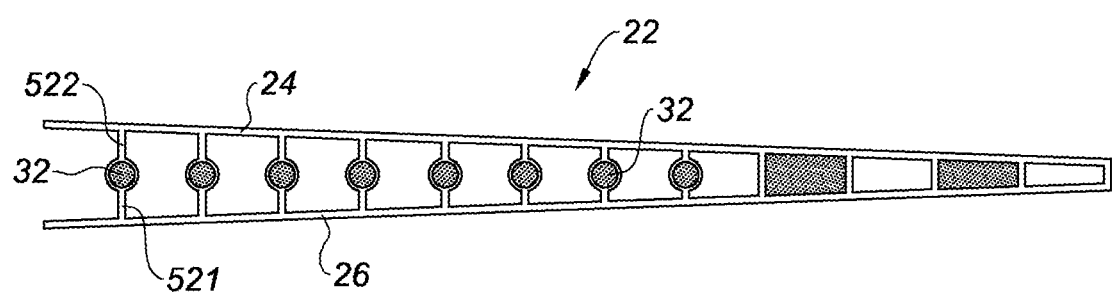
FIG. 9 is a detail view of FIG. 1 illustrating the shroud of the nacelle including the heat exchange channels according to a sixth form of the present disclosure.

In a sixth form of the present disclosure, illustrated in FIG. 9, the cooling device includes a series of channels 32 each comprising a wall connected to the inner face 26 of the shroud 22 by a first rib 521 and connected to the outer face 24 of the shroud 22 by a second rib 522. In this example, the channels 32 have a circular section.

According to another aspect, an advantage of the present disclosure relates to the form of the shroud 22.

Indeed, the shroud 22 can be obtained by an extrusion-type manufacturing method which makes it possible to obtain a profile which is later bent in the shape of a shroud 22.

Also, the shroud 22 can be obtained directly by pultrusion.

According to a variant of the present disclosure, the inner face 26 of the shroud 22 is pierced with a plurality of holes.

The holes are made so as not to pierce the channels 32.

Thus, this variant is not adapted to the first form of the present disclosure shown in FIG. 4 since the channels 32 cover a large part of the inner face 26 of the shroud 22.

Conversely, according to the other forms, the holes are arranged so as to open into cavities thus forming acoustic resonators that absorb some of the noise emitted by the engine.

These cavities are formed for example by empty channels 32, in which the fluid does not circulate.

The large volume of the empty channels 32 provides interesting acoustic absorption characteristics.

The present description of the present disclosure is given by way of non-limiting example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle of a turbine engine having a tubular structure and delimiting a secondary flow path, the nacelle comprising:
   a shroud forming a trailing edge and arranged at a downstream end of the nacelle, the shroud having a tubular shape about a longitudinal axis and being delimited by at least one outer face subjected to an outside air flow, the outside air flow being outside the nacelle, and an inner face subjected to an inside air flow circulating in the secondary flow path of the nacelle; and
   a cooling device comprising at least one heat exchange channel traversed by a heat transfer fluid to dissipate calories conveyed by the heat transfer fluid, the at least one heat exchange channel having an inlet and an outlet connected to a source of heat exchange fluid via an inlet duct and an outlet duct, the at least one heat exchange channel extending into the shroud, wherein said at least one heat exchange channel is delimited by an outer wall, an inner wall and two side walls, the outer wall being formed by the outer face of the shroud, the inner wall being formed by the inner face of the shroud,
   wherein the inside air flow extends axially and does not enter the cooling device.

2. The nacelle of the turbine engine according to claim 1, wherein the at least one heat exchange channel extends circumferentially about an axis of the shroud.

3. The nacelle of the turbine engine according to claim 1, wherein the inner face of the shroud is pierced with a plurality of holes which open into at least one cavity of the shroud, forming an acoustic resonator.

4. The nacelle of the turbine engine according to claim 1, wherein a width of the at least one heat exchange channel is between one and one hundred millimeters.

5. The nacelle of the turbine engine according to claim 1, wherein the cooling device includes:
   a plurality of said heat exchange channels;
   an inlet collector interposed between the inlet duct and the inlet of each heat exchange channel of the plurality of heat exchange channels; and
   an outlet collector interposed between the outlet duct and the outlet of each heat exchange channel of the plurality of heat exchange channels.

6. The nacelle of the turbine engine according to claim 5, wherein the inlet duct and the outlet duct are extensible and adapted to allow a spacing between the shroud and the heat transfer fluid source.

7. The nacelle of the turbine engine according to claim 1, wherein the shroud is obtained by an extrusion-type manufacturing method.

8. The nacelle of the turbine engine according to claim 1, wherein the at least one heat exchange channel is added onto the shroud.

* * * * *